US006746593B2

United States Patent
Herbst

(10) Patent No.: US 6,746,593 B2
(45) Date of Patent: Jun. 8, 2004

(54) HIGH VOLUME ELECTROLYTIC WATER TREATMENT SYSTEM AND PROCESS FOR TREATING WASTEWATER

(76) Inventor: Robert J. Herbst, 3201 S. Zuni St. Unit B, Englewood, CO (US) 80110

( * ) Notice: Subject to any disclaimer, the term of this patent is extended or adjusted under 35 U.S.C. 154(b) by 120 days.

(21) Appl. No.: 10/050,371

(22) Filed: Jan. 18, 2002

(65) Prior Publication Data

US 2003/0136686 A1 Jul. 24, 2003

(51) Int. Cl.[7] .......................... C02F 1/463; C02F 1/465
(52) U.S. Cl. ...................... 205/757; 205/742; 204/237; 204/269; 204/275.1
(58) Field of Search ................................. 205/757, 742; 204/237, 269, 275.1

(56) References Cited

U.S. PATENT DOCUMENTS 5,928,493 A  7/1999  Morkovsky et al. ........ 205/757

FOREIGN PATENT DOCUMENTS

WO    WO 96/17667    6/1998

*Primary Examiner*—Arun S. Phasge
(74) *Attorney, Agent, or Firm*—Edwin H. Crabtree; Ramon L. Pizarro; Donald W. Margolis

(57) ABSTRACT

A high volume electrolytic water treatment system and process for treating wastewater. The system and process is designed to treat waste streams that are both complex and with variable contaminate compositions. The system includes pumping influent water to a headworks screen for removing solids in the water. The screened water is then discharged into primary and secondary surge tanks. The tanks include electrocoagulation electrodes. The electrodes, using alternating current, destabilize materials such as fats, oils, greases and surfactants. The pretreated influent water is then pumped to one or more elongated flow-through modules. The flow-through modules also include electrocoagulation electrodes for further treating of the influent water. From the flow-through modules, the treated water is sent to a foam removal apparatus and then to a clarifier. Clear water from the clarifier then flows into an effluent weir and discharged from the system thereby completing the water treatment process.

16 Claims, 1 Drawing Sheet

US 6,746,593 B2

HIGH VOLUME ELECTROLYTIC WATER TREATMENT SYSTEM AND PROCESS FOR TREATING WASTEWATER

BACKGROUND OF THE INVENTION (a) Field of the Invention

This invention relates to a system and process for treating wastewater and more particularly, but not by way of limitation, to a high volume electrolytic water treatment process for greatly reducing various types of contaminates held in suspension in the wastewater and waste streams.

(b) Discussion of Prior Art

Heretofore, previous "flow-through" water treatment processes have had flaws that prevented them from being viable treatments for large, complex and variable waste streams. A particular flaw was the scaling and plugging of electrodes, which plagued the treatment process as the wastewater stream changed in composition. It is possible to develop a treatment scheme that will not plug the electrodes if the composition of the stream remained relatively consistent, but not if the composition varies. Efforts to install elaborate monitoring and control systems have failed when waste stream contaminants coated or blinded sensors, thus rendering the system controls useless. Other methods have been employed to prevent scaling and plugging of the electrodes including polarity reversing and other processing aids. But these methods have proven to be unreliable.

Methods for increasing dwell time for contaminated water in electrode modules and the surface area of the electrodes have been tried by increasing the number of electrode plates in the module or increase the number of modules. But, these optional methods increase the pumping pressure of the water necessary to push the fluid through the electrode modules. The increased water pressure causes extra strain on electrode module gaskets and if the pressure is high enough, leaks and failure of the module may occur. Additionally, in these cases, there is little or no chance for the precipitate to develop or coagulate into bigger particles or for any secondary separation to occur between the modules and electrode plates. The limited coagulation time increases the need for the residence time in the foam removal apparatus and the clarifier in order to allow for the formation of coagulated floc and its subsequent increase in size and density. The designing of a wastewater treatment system to allow for more or less residence time in tanks and clarifiers is very difficult.

In previous "flow-through" electrocoagulation processes, including tubular modules as described in U.S. Pat. Nos. 4,293,400 and 4,378,276 to Liggett, improved removal rates have been shown. The improvements were due to the pre-alignment effect of passing the water to be treated through the electronegative or electropositive backside of the electrodes. These methods served to align the contaminant molecules and ions in the waste stream and made them more susceptible to react as the electrical current or electromotive force was introduced into the waste stream. This electrochemical phenomena is further enhanced by the subject invention by the application of reversing polarity of the direct electrical current current, which provides the electromotive force to drive the electrochemical reaction.

In U.S. Pat. No. 5,587,057 to Metzler et al., an electrocoagulation process is described having electrodes for treating a highly conductive liquid. In U.S. Pat. No. 4,1872,959 to Herbst et al. and U.S. Pat. Nos. 5,043,050 and 5,423,962 to Herbst, the inventor of the subject invention, Robert J. Herbst describes different types of improved electrolytic systems for treating aqueous solutions using conductive conduits and precipitating various organic and inorganic materials suspended in the solution.

None of the above mentioned prior art electrolytic treatment systems for treating liquids disclose the unique features of the subject invention which provides a mechanism for treating high volume, complex and variable waste streams with reliability and functionality not obtainable with other electrocoagulation and flow-through water treatment systems and processes.

SUMMARY OF THE INVENTION

In view of the foregoing, it is a primary objective of the subject invention to treat high volumes of waste streams in a range of 1000 to 5000 gallons per minute and greater.

Another object of the invention is the system and process is designed to treat waste streams that are both complex and with variable contaminate compositions.

Still another object of the wastewater treatment system is to greatly reduce contaminate levels in the water using a combination of one or more electrocoagulation modules and one or more flow-through modules.

Yet another object of the treatment system and process is to treat the water first using electrocoagulation modules for effectively handling solids and dropping out solids prior to introducing the resultant fluid to flow-through modules.

A further object of the invention is to use electrocoagulation modules with alternating electrical current for increased floc development time. The increased development time provides for stabilizing and collecting larger and less fragile flocs on the electrodes, thereby providing for ease in removal.

The high volume electrolytic water treatment system for treating wastewater includes pumping influent water to a headworks screen for removing solids in the water. The screened water is then discharged into primary and secondary surge tanks. The tanks include electrocoagulation electrodes. The electrodes, using reversing polarity direct current, destabilize materials such as fats, oils, greases and surfactants. The pretreated influent water is then pumped to one or more elongated flow-through modules. The flow-through modules also include electrocoagulation electrodes for further treating of the influent water. From the flow-through modules, the treated water is sent to a foam removal apparatus and then to a clarifier. Clear water from the clarifier then flows into an effluent weir and discharged from the system thereby completing the water treatment process.

These and other objects of the present invention will become apparent to those familiar with different types of processes and systems for electrolytic, electrochemical or electrocoagulation treatment of high volumes of contaminated water when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the principles thereof, and in which.

DESCRIPTION OF THE PREFERRED EMBODIMENTS

Figure 1:
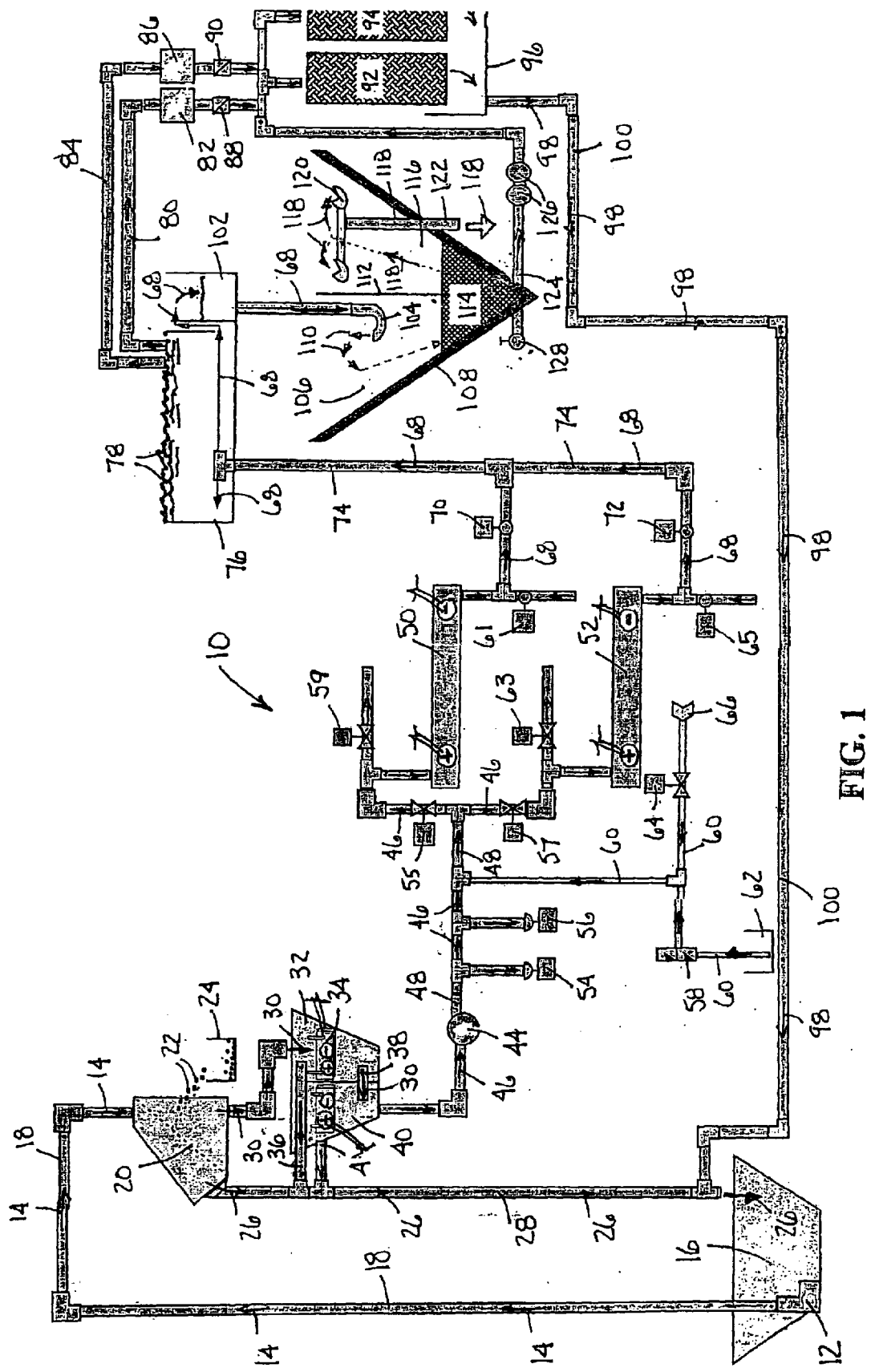
FIG. 1 illustrates a flow diagram and the individual components making up the subject high volume electrolytic water treatment system and process for treating and cleaning wastewater streams.

In FIG. 1, a perspective view of the subject electrolytic water treatment system is illustrated having a general reference numeral 10. The system 10 includes a wastewater influent pump 12 for pumping the influent water, indicated as arrows 14, to be treated from an influent source 16. The influent source 16 may be a holding tank, sump, pit, pond, lagoon and the like. The influent pump 12 transfers the influent water 14 via an influent line 18 to a headworks screen 20 where screened solids 22 are removed to a solids collection unit 24. Excess water, as indicated by arrows 26, is returned to the influence source 16 via a screen overflow line 28.

Screened influent water, as indicated by arrows 30, is now fed into the top of a primary influent surge tank 32. The primary influent surge tank 32 serves as a treatment tank having primary electrocoagulation electrodes 34 connected to a power source. The power source is not shown in the drawings. The power source is used for alternating positive and negative current to the electrodes 34. These electrodes are used to destabilize the first of a series of contaminates separated from the screened influent water 30. The greatest percentage of destabilized material will be light floating material, like fats, oils, greases and surfactants such as soap. Also, there will be certain percentage of light suspended colloidal solids such as dirt and food particles separated from the screened influent. Most of these destabilized contaminants will float and then flow out of the primary influent surge tank 32 through a primary overflow line 36 as excess screened influent causes the tank to overflow. The primary overflow line 36 is connected to the screen overflow line 28. The overflow water is typically in a range of 5 to 10 percent of the screened influent water 30. The balance of the electrode treated water flows through a controlled bypass flow line 38 into a secondary influent surge tank 40.

The secondary influent surge tank 40 contains secondary electrocoagulation electrodes 42 connected to the power source for alternating positive and negative current to the electrodes 42. These electrodes are used to destabilize more of the contaminates in the screened influent water 30. In the secondary influent surge tank 40, the greatest percentage of destabilized material will be colloidal particles, coagulated protein molecules and most of the fats, oils and greases that were not removed in the primary influent surge tank 32. The secondary tank 40 is connected to a secondary overflow line 43 connected to the screen overflow line 28.

It should be mentioned that both the primary and secondary influent surge tanks 32 and 40 can be connected to a vacuum line or a mechanical skimmer for removing the destabilized contaminants if there is sufficient volume to warrant extra separation equipment Also, it may be advantageous in extreme cases, where the wastewater includes high solid content, to have additional influent surge tanks for subsequent treatment and solids reduction. Further, during the electrochemical treatment in the surge tanks, heavy sludge may accumulate at the bottom of the two tanks. Therefore, it may be advantageous to remove a percentage of the sludge in order to reduce the amount of heavy solids moving downstream in the subject process. Still further, the overflow amounts of the secondary treatment and subsequent treatment of the water should be typically in a range of 5 to 10 percent of the screened influent water 30.

A system feed pump 44 now pumps pretreated influent water, as indicated by arrows 46, through a pretreated line 48 to a first elongated flow-through module 50 and a second flow-through module 52. The pretreated influent water 46 is pumped back and forth along a circuitous path inside the modules 50 and 52 and across the surface area of the flat plates of the electrodes inside the modules. The electrodes are connected to a power source used for alternating positive and negative current to the electrodes. The flow-through electrodes inside the modules 50 and 52 and the power source are not shown in the drawings.

Between the system feed pump 44 and the two flow-through modules 50 and 52 are a first pressure control switch 54 and a second pressure control switch 56. The control switches 54 and 56 are designed to aid in the control of scaling and/or plugging of the flow-through modules 50 and 52. The switches 54 and 56 have a preset pressure along with an alarm to indicate pressure build up or drop in fluid flow so that either module can be shut down for maintenance service. Also, the first control switch 54 is connected to a first module flow valve 55 for opening and closing pretreated water flow into the first flow-through module 50. Likewise, the second control switch 56 is connected to a second module flow valve 57 for opening and closing pretreated water flow into the second flow-through module 52.

The two pressure control switches 54 and 56 can be designed to activate a chemical feed pump 58 attached to a feed line 60 connected to the pretreated line 48. The feed pump 58 is connected to a chemical reservoir 62 for feeding a chemical cleaner into either the first flow-through module 50 or the second flow-through module 52. Also the feed line 60 is connected to an air or $CO_2$ valve 64 and an air or $CO_2$ supply inlet 66 for feeding air or $CO_2$ into the modules 50 and 52 and cleaning the modules. Obviously, depending on the type of scaling and/or plugging in the modules, a selected chemical, water or $CO_2$ can be used for cleaning the modules prior to putting them back into service.

The first flow-through module 50 includes a first overpressure bypass valve 59 and a first overpressure bypass inlet 61. The second flow-through module 52 includes a second overpressure bypass valve 63 and a second overpressure bypass inlet 65. The two bypass valves and the two bypass inlets are used for a backwash or back flushing phase of the modules.

Treated water, as indicated by arrows 68, flows from one of the flow-through modules 50 or 52 through first and second discharge selection valves 70 and 72 connected to a discharge line 74. The discharge line 74 is connected to a foam removal tank 76. Foam and floating sludge 78 rises to the surface in the tank and is drawn into a first vacuum line 80 connected to a first vacuum 82 and a second vacuum line 84 connected to a second vacuum 86. The first and second vacuums 82 and 86 provide suction for removing foam, floating sludge and the like from the tank 76. A first vacuum check valve 88 is used to open the first vacuum 82 when the second vacuum 86 is closed. In turn, a second vacuum check valve 90 is used to open the second vacuum 86 when the first vacuum 82 is closed.

The foam and floating sludge 78 drains from the vacuums 82 and 86 into first and second dewatering basket filters 92 and 94. A concentrated water from the two basket filters is drained into a supernate collection pan 96. The filtered water, as indicated by arrows 98, is now returned to the influent source 16 via a supernate return line 100, which is connected to the influent line 18.

Returning to the foam removal tank 76, the treated water 68, with foam and floating sludge removed, flows into a defoamed overflow holding area 102. The treated water 68 then flows into a "J" shaped clarifier inlet 104 disposed inside a precipitate collection area 106 of a water clarifier 108. The treated water 68 now becomes clarifier influent water, as indicated by arrows 110. The precipitate collection area 106 is important in that it allows enough dwell time for floc in the clarifier influent water 110 to come together in large enough and stable enough pieces to settle to the bottom of the clarifier 108.

The clarifier influent water 110 now travels under a baffle 112 and through a sludge blanket 114, that builds up in the bottom of the clarifier 108, into a clear water dwell area 116 of the clarifier. The resultant clear water, as indicated by arrows 118, is calmed in the dwell area 116 and any solids remaining in the clear water 118 are allowed to settle into the sludge blanket 114. The clear water 118 now travels up and over an effluent weir 120 and out a clear water discharge tube 122, thus completing the process of treating the wastewater in the subject water treatment system 10.

The sludge blanket 114 is removed from the bottom of the clarifier 108 via a sludge collection line 124 connected to a sludge pump 126. The sludge blanket 114 is pumped to the dewatering basket filters 92 and 94 for further dewatering. The consistency of the sludge blanket 1 14 can be observed by getting a small portion of sludge from a sludge sample port 128. It is important, during the water treatment process, to continue to remove enough sludge to keep the sludge blanket 114 about one half of the distance between the top and bottom of the clarifier 108 to its top. This feature provides enough of a sludge thickness to collect the particles of floc and pin floc, but not allow the sludge blanket 114 to get high enough to spill over the effluent weir 120.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

What is claimed is:

1. A high volume electrolytic water treatment system for treating influent wastewater and removing both complex and variable contaminate compositions found in the influent wastewater, the system comprising:
   a primary influent surge tank with electrocoagulation electrodes mounted therein, said electrodes connected to a power source, said electrodes for destabilizing materials found in the wastewater received inside said primary influent surge tank;
   a first flow-through module with electrocoagulation electrodes mounted therein, said electrodes connected to a power source, said electrodes for further treating the influent wastewater received inside said first flow-through module and removing contaminates found therein, said first flow-through module connected to and downstream from said primary surge tank for receiving the pretreated wastewater therefrom; and
   a foam removal tank with vacuum connected to and downstream from said first flow-through module, said vacuum for removing foam and floating sludge from the treated water in said foam removal tank.

2. The system as described in claim 1 further including a secondary influent surge tank with electrocoagulation electrodes mounted therein, said electrodes connected to a power source, said electrodes for further destabilizing materials found in the wastewater received inside said secondary influent surge tank, said secondary influent surge tank connected to and between said first influent surge tank and said first flow-through module.

3. The system as described in claim 1 further including a second flow-through module with electrocoagulation electrodes mounted therein, said electrodes connected to a power source, said electrodes for further treating the influent wastewater received inside said second flow-through module and removing contaminates found therein, said second flow-through module connected to and downstream from said primary surge tank.

4. The system as described in claim 1 further including a clarifier connected to and downstream from said foam removal tank, said clarifier for allowing sufficient dwell time for floc in clarified influent water to come together in large enough and stable enough pieces to settle to a bottom of said clarifier.

5. The system as described in claim 1 further including a headworks screen connected to and upstream from said primary influent surge tank, said headworks screen for screening solids suspended in the influent wastewater prior to receipt of the wastewater inside said primary influent surge tank.

6. A high volume electrolytic water treatment system for treating influent wastewater and removing both complex and variable contaminate compositions found in the influent wastewater, the system comprising:
   a primary influent surge tank with electrocoagulation electrodes suspended therein, said electrodes connected to a power source for providing alternating current thereto, said electrodes for destabilizing materials found in the wastewater received inside said primary influent surge tank;
   a first flow-through module with electrocoagulation electrodes disposed therein, said electrodes connected to a power source for providing alternating current thereto, said electrodes for further treating the influent wastewater received inside said first flow-through module and removing contaminates found therein, said first flow-through module connected to and downstream from said primary influent surge tank; and
   a foam removal tank with vacuum connected to and downstream from said first flow-through module and said second flow-through module, said vacuum for removing foam and floating sludge from the treated water in said foam removal tank.

7. The system as described in claim 6 further including a secondary influent surge tank with electrocoagulation electrodes suspended therein, said electrodes connected to a power source for providing alternating current thereto, said electrodes for further destabilizing materials found in the wastewater received inside said secondary influent surge tank, said secondary influent surge tank connected to and between said first influent surge tank and said first flow-through module.

8. The system as described in claim 7 further including a second flow-through module with electrocoagulation electrodes disposed therein, said electrodes connected to a power source for providing alternating current thereto, said electrodes for further treating the influent wastewater received inside said second flow-through module and removing contaminates found therein, said second flow-through module connected to and downstream from said secondary surge tank.

9. The system as described in claim 6 further including a dewatering basket filter connected to said vacuum for receiving the foam and floating sludge from said foam removal tank.

10. The system as described in claim 9 further including a supernate collection pan disposed below said dewatering basket filter for receiving filtered water therefrom.

11. The system as described in claim 6 further including a clarifier connected to and downstream from said foam removal tank, said clarifier for allowing sufficient dwell time for floc in clarified influent water to come together in large enough and stable enough pieces to settle to a bottom of said clarifier, said clarifier having an effluent weir mounted therein for receiving and discharging clear water from said clarifier.

12. A process for treating influent wastewater and removing both complex and variable contaminate compositions found in the influent wastewater, the process using a primary influent surge tank with electrocoagulation electrodes connected to a power source and a first flow-through module with electrocoagulation electrodes mounted therein and connected to a power source, the steps comprising:

introducing the influent wastewater into the primary influent surge tank and treating the wastewater water using the electrocoagulation electrodes and destabilizing suspended materials found therein; and introducing the pretreated wastewater from the primary influent surge tank into the first flow-through module and further treating the influent wastewater and removing contaminates found therein; and discharging the treated wastewater from the first flow-through module into a foam removal tank with vacuum, the vacuum used for removing foam and floating sludge from the treated water in the foam removal tank.

13. The process as described in claim 12 further including the step of introducing the pretreated wastewater from the primary influent surge tank into a secondary influent surge tank with electrocoagulation electrodes connected to a power source, the second influent surge tank further treating the influent wastewater and removing contaminates found therein prior to introducing the pretreated wastewater into the first flow-through module.

14. The process as described in claim 12 further including the step of introducing the pretreated wastewater from the primary influent surge tank into a second flow-through module and further treating the influent wastewater and removing contaminates found therein and discharging the treated wastewater from the second flow-through module.

15. The process as described in claim 12 further including the step of introducing the treated wastewater from the foam removal tank into a clarifier and allowing sufficient dwell time for floc in clarified influent water to come together in large enough and stable enough pieces to settle to a bottom of the clarifier.

16. The process as described in claim 12 further including the step of first introducing the influent wastewater into a headworks screen for screening solids suspended in the influent wastewater prior to introducing the wastewater inside the primary influent surge tank.

* * * * *